(12) United States Patent
Jiang et al.

(10) Patent No.: US 9,182,023 B2
(45) Date of Patent: Nov. 10, 2015

(54) LINEAR MOTION SYSTEM WITH AUTOMATIC LUBRICATOR

(71) Applicant: HIWIN TECHNOLOGIES CORP., Taichung (TW)

(72) Inventors: Zong-Sian Jiang, Taichung (TW); Che-Kang Chang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 233 days.

(21) Appl. No.: 13/846,144

(22) Filed: Mar. 18, 2013

(65) Prior Publication Data

US 2014/0260729 A1    Sep. 18, 2014

(51) Int. Cl.
| | |
|---|---|
| F16H 25/24 | (2006.01) |
| F16H 57/04 | (2010.01) |
| F16H 25/22 | (2006.01) |

(52) U.S. Cl.
CPC ........ *F16H 25/2214* (2013.01); *F16H 25/2204* (2013.01); *F16H 57/0464* (2013.01); *F16H 57/0497* (2013.01); *Y10T 74/18576* (2015.01)

(58) Field of Classification Search
CPC ........... F16H 3/06; F16H 27/02; F16H 29/20; F16H 25/22; F16H 25/2015; F16H 57/0449; F16H 59/0217; F16H 59/044; F16H 25/24; F16H 57/0497

USPC ........... 74/89.23, 89.44, 89.4, 89.43, 424.81; 184/5, 100; 310/75 R, 80

See application file for complete search history.

(56) References Cited

U.S. PATENT DOCUMENTS

| | | | | |
|---|---|---|---|---|
| 4,042,796 | A * | 8/1977 | Zink | 200/61.45 R |
| 5,342,036 | A * | 8/1994 | Golicz | 271/3.17 |
| 5,852,361 | A * | 12/1998 | Ouchi et al. | 324/174 |
| 6,240,796 | B1 * | 6/2001 | Yamada | 74/89.23 |
| 6,691,837 | B1 * | 2/2004 | Kapaan et al. | 188/72.1 |
| 7,290,938 | B2 * | 11/2007 | Aoki et al. | 384/448 |
| 8,302,499 | B2 * | 11/2012 | Chen et al. | 74/89.44 |
| 2007/0137349 | A1 * | 6/2007 | Tokura et al. | 74/424.86 |
| 2009/0071278 | A1 * | 3/2009 | Chiu et al. | 74/424.82 |
| 2012/0014631 | A1 * | 1/2012 | Huang et al. | 384/446 |

* cited by examiner

*Primary Examiner* — William Kelleher
*Assistant Examiner* — Bobby Rushing, Jr.
(74) *Attorney, Agent, or Firm* — Muncy, Geissler, Olds & Lowe, P.C.

(57) ABSTRACT

A linear motion system includes an elongated shaft, a movable member mounted at the elongated shaft, a lubricator unit defining therein a grease storage container for storing a lubricating grease, a motor mounted in the grease storage container, a lubricating grease guide connected to the motor, a controller mounted in the grease storage container, and a sensor adapted to provide an actuation signal to the controller upon movement of the movable member, causing the controller to start the motor in moving the lubricating grease guide to expel the storage lubricating grease out of the grease storage container onto the surface of the elongated shaft so as to achieve a self-lubricating effect.

5 Claims, 11 Drawing Sheets

LINEAR MOTION SYSTEM WITH AUTOMATIC LUBRICATOR

BACKGROUND OF THE INVENTION

1. Field of the Invention

The present invention relates to linear motion technology and more particularly, to a linear motion system with automatic lubricator.

2. Description of the Related Art

U.S. Pat. No. 8,302,499 discloses a linear transmission system with a lubrication device (the reference signs of the following components are quoted from the specification of the cited patent), which discloses the use of a motor F to rotate a helical blade 61, making a lubricating grease overflow to the surface of an elongated shaft 1 to perform lubrication synchronously during rotation of the helical blade 61.

In the case of the aforementioned patent, regardless of the linear transmission system is in operation, the motor F keeps rotating the helical blade 61 to continuously deliver the lubricating grease to the surface of the elongated shaft 1, causing unnecessary waste and increasing the cost.

SUMMARY OF THE INVENTION

The present invention has been accomplished under the circumstances in view. It is the main object of the present invention to provide a linear motion system with automatic lubricator, which will fill the lubricating grease only when it is in operation, preventing unnecessary waste and effectively saving the cost.

To achieve this and other objects of the present invention, a linear motion system comprises an elongated shaft, a movable member, a plurality of rolling elements, a lubricator unit and a sensor. The movable member is linearly movably mounted at the elongated shaft. The rolling elements are rotatably mounted between the elongated shaft and the movable member. The lubricator unit comprises a grease storage container, a motor, a lubricating grease guide and a controller. The grease storage container defines therein a grease storage chamber, and a grease discharging hole in communication with the grease storage chamber. The grease storage chamber is adapted to store a lubricating grease and kept in communication with the surface of the elongated shaft via the grease discharging hole. The lubricating grease guide is mounted in the grease storage chamber of the grease storage container and connected to the motor. The controller is electrically connected to the motor. The sensor is electrically connected to the controller of the lubricator unit, and adapted to provide an actuation signal to the controller intermittently upon movement of the movable member. Thus, when the movable member moves axially along the elongated shaft, the sensor provides the actuation signal to the controller, causing the controller to start the motor. During rotation of the motor, the lubricating grease guide is rotated by the motor to guide the storage lubricating grease out of the grease discharging hole onto the surface of the elongated shaft, achieving a self-lubricating effect.

DETAILED DESCRIPTION OF THE INVENTION

The advantages and features of the present invention will be fully understood by reference to the following examples in conjunction with the accompanying drawings.

Figure 1:
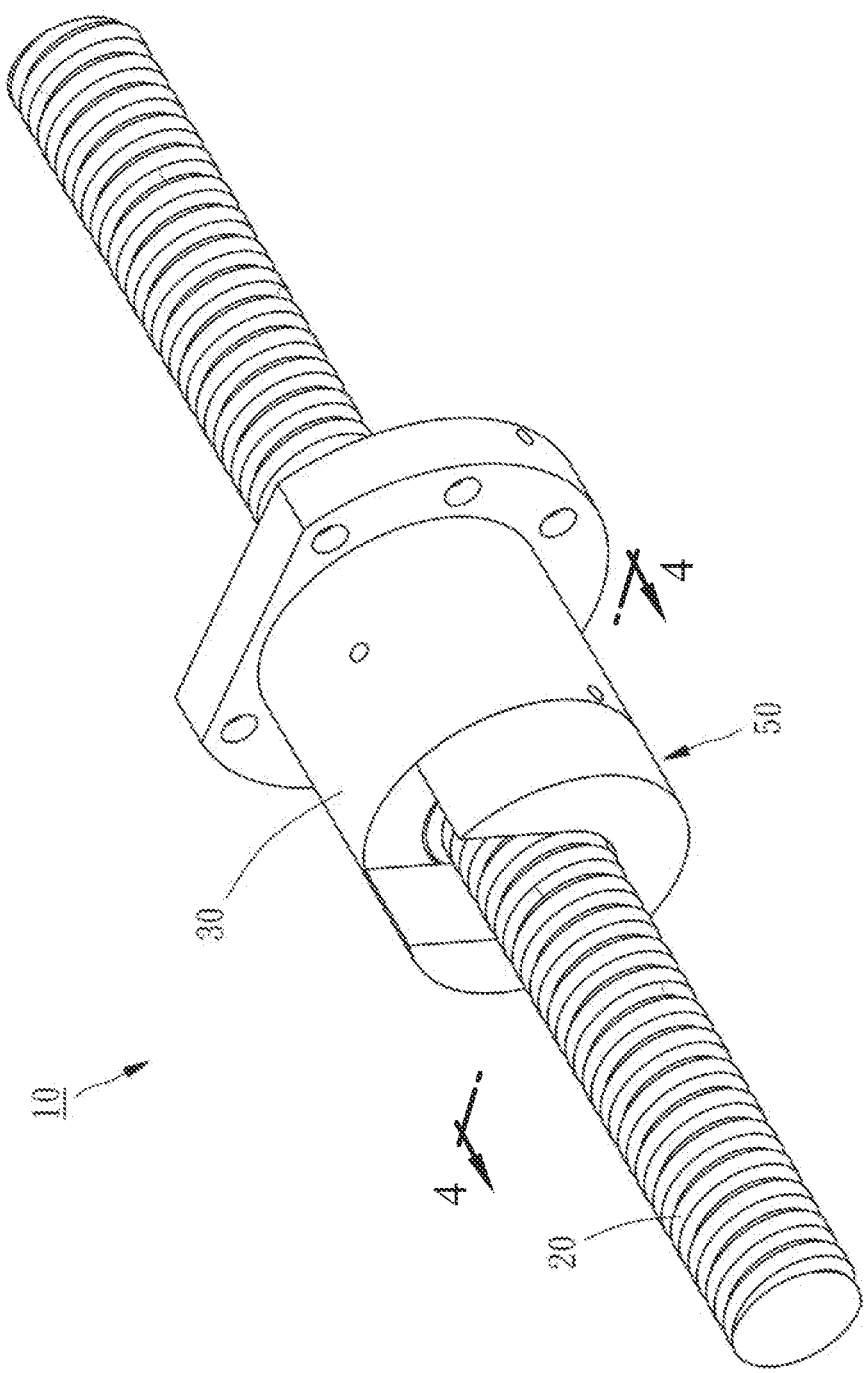
FIG. 1 is an elevational view of a linear motion system in accordance with a first embodiment of the present invention.
Figure 2:
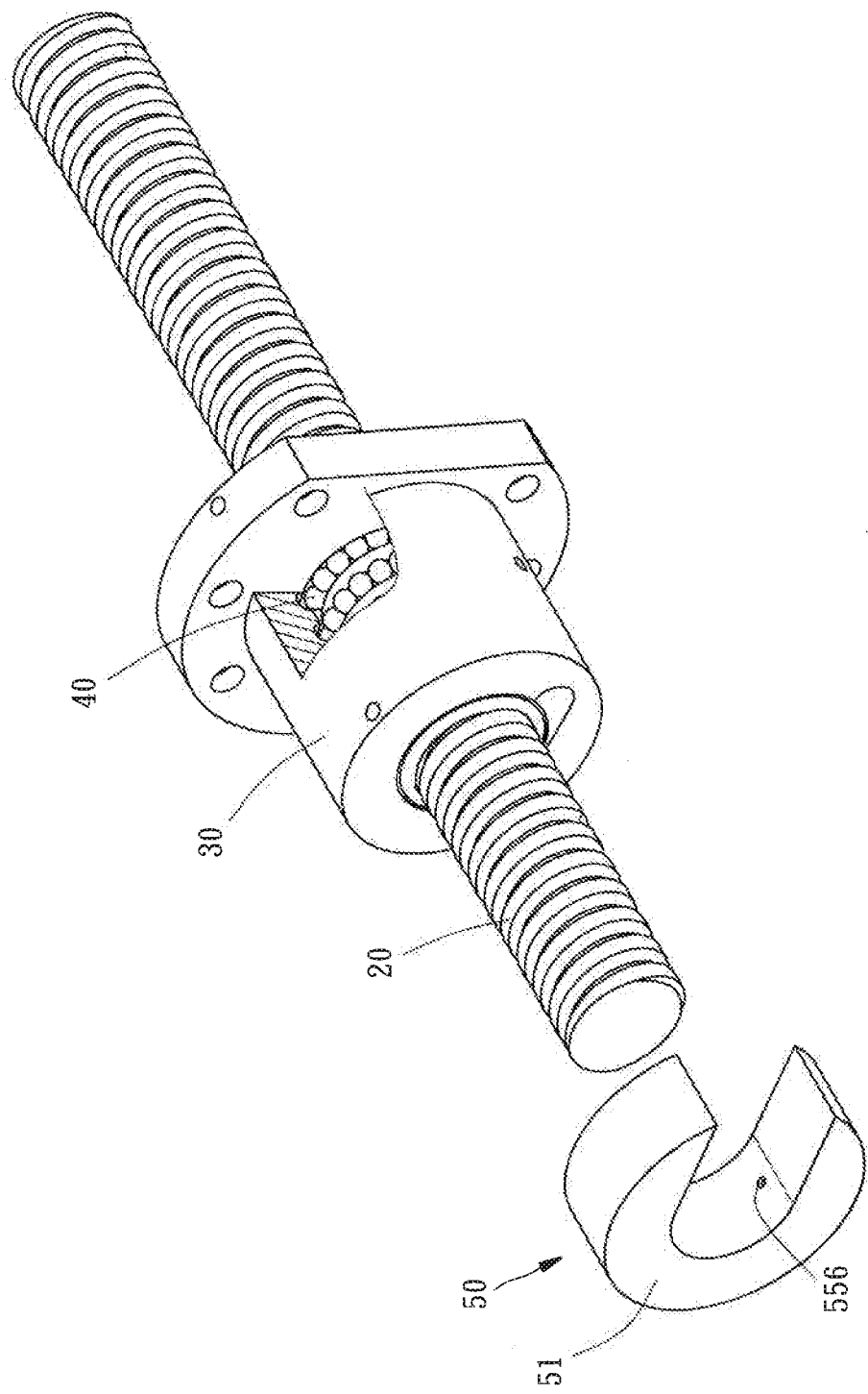
FIG. 2 is a partial exploded view of the linear motion system in accordance with the first embodiment of the present invention.
Figure 4:
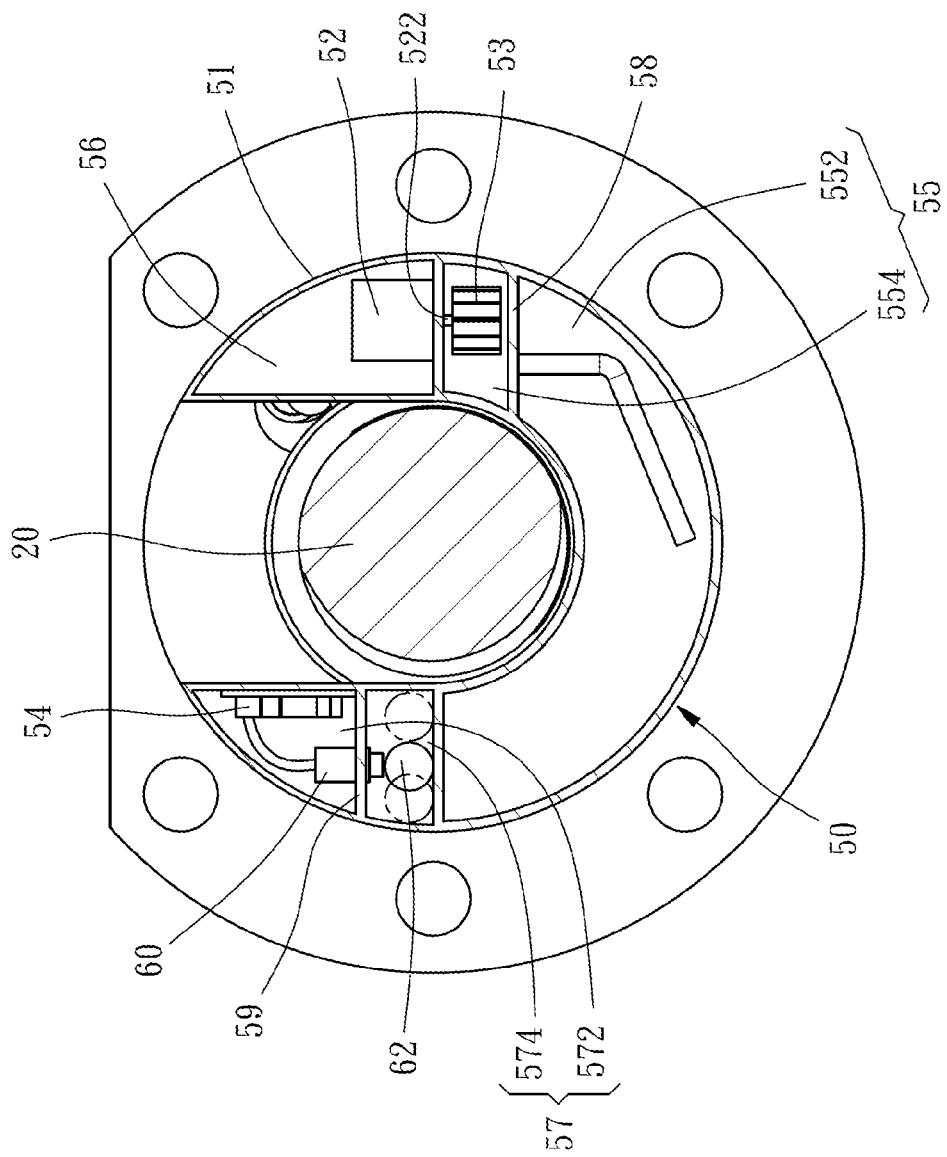
FIG. 4 is a sectional view taken along line 4-4 of FIG. 1.

Referring to FIGS. 1, 2 and 4, a linear motion system 10 in accordance with a first embodiment of the present invention is shown. As illustrated, the linear motion system 10 comprises an elongated shaft 20, a movable member 30, a plurality of rolling elements 40, a lubricator unit 50, and a sensor 60. According to this embodiment, linear motion system 10 is a ball screw, and therefore, the elongated shaft 20 is a screw rod, and the movable member 30 is a screw nut.

Figure 3:
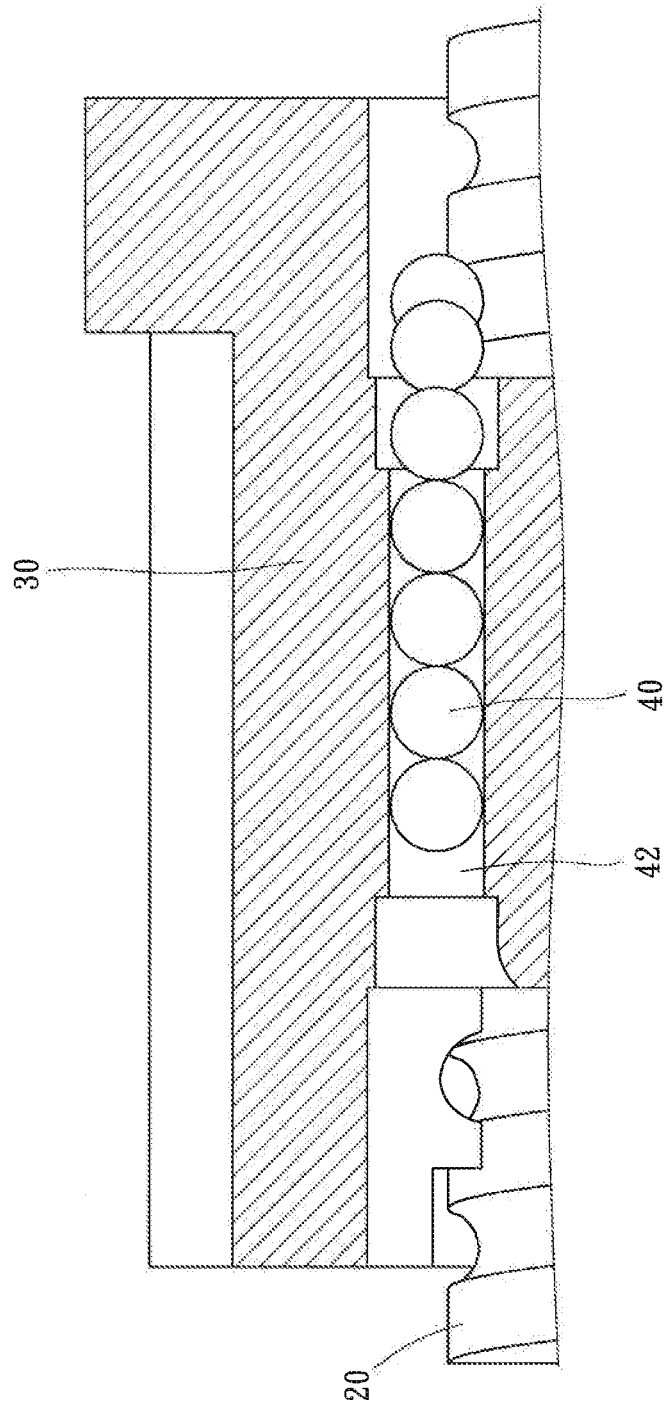
FIG. 3 is a partial sectional view of the linear motion system in accordance with the first embodiment of the present invention.

The movable member 30 is rotatably mounted on the elongated shaft 20 and movable back and forth in axial direction along the elongated shaft 20, defining with the elongated shaft 20 a circulation passage 42 (see FIG. 3).

The rolling elements 40 are mounted in the circulation passage 42 and movable along the circulation passage 42 during movement of the movable member 30 relative to the elongated shaft 20.

Referring to FIG. 4 again, the lubricator unit 50 comprises a grease storage container 51, a motor 52, a lubricating grease guide 53 and a controller 54.

The grease storage container 51 in this embodiment is hung on the elongated shaft 20 and connected to one end of the movable member 30, defining therein a grease storage chamber 55, a power chamber 56 adjacent to the grease storage chamber 55, and a control chamber 57 adjacent to the grease storage chamber 55. The grease storage chamber 55 is adapted to store a lubricating grease, and divided by a first partition board 58 into a main chamber 522 and a sub chamber 554. The sub chamber 554 is kept in communication with the surface of the elongated shaft 20 via a grease discharging hole 556 (see FIG. 2). The control chamber 57 is divided by a second partition board 59 into a control slot 572 and a stirring bath 574. A stirrer 62 (for example, steel ball) is accommodated in the stirring bath 574. The motor 52 is fixedly mounted in the power chamber 56 of the grease storage container 51, comprising a drive shaft 522 that extends to the inside of the sub chamber 554. The lubricating a grease guide 53 is connected to the drive shaft 522 of the motor 52 in the sub chamber 554 of the of the grease storage container 51, and driven by the motor 52. During rotation of the motor 52, the lubricating grease guide 53 is driven to guide the storage lubricating grease out of the sub chamber 554 to the surface of the elongated shaft 20 via the grease discharging hole 556. The controller 54 is fixedly mounted in the control slot 572 of the control chamber 57 of the grease storage container 51 and electrically connected to the motor 52 for on/off control of the motor 52.

The sensor 60 in this embodiment is a proximity switch mounted in the second partition board 59 within the control chamber 57 of the grease storage container 51 and electrically connected to the controller 54, and adapted to detect a position change of the stirrer 62 and to provide an actuation signal to the controller 54 subject to its detection.

Figure 5:
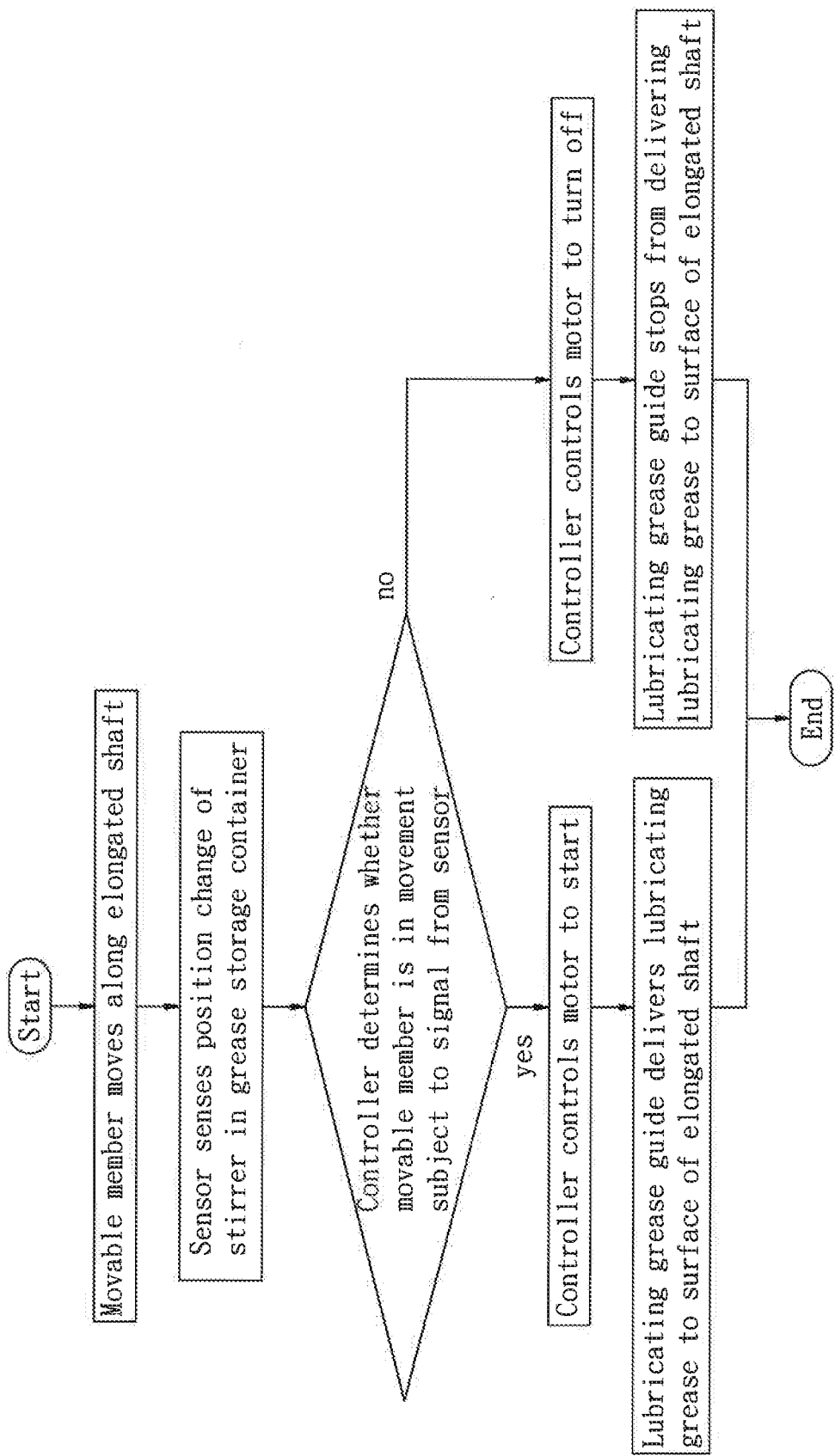
FIG. 5 is a flow chart illustrating the operation of the linear motion system in accordance with the first embodiment of the present invention.

Based on the above described structure, as shown in FIG. 5, when the movable member 30 starts to move axially along the elongated shaft 20, the lubricator unit 50 will follow the movable member 30, causing the stirrer 62 to rotate freely in the stirring bath 574. When the sensor 60 senses the stirrer 62, it immediately provides an actuation signal to the controller 54, causing the controller 54 to start the motor 52. Thus, the lubricating grease guide 53 can be driven by the motor 52 to expel the storage lubricating grease out of the grease storage chamber 55 to the surface of the elongated shaft 20 via the grease discharging hole 55, achieving the aim of self lubrication. Once the sensor 60 cannot detect the presence of the stirrer 62, it will interrupt the actuation signal. At this time, the controller 54 receives no signal and will make the motor 52 off, stopping the lubricating grease guide 53 from propelling the lubricating grease. Therefore, when the stirrer 62 keeps rotating, i.e., during movement of the movable member 30, the sensor 60 will provide the actuation signal to the controller 54 intermittently, enabling the controller 54 to control the lubricator unit 50 in performing lubrication.

Figure 6:
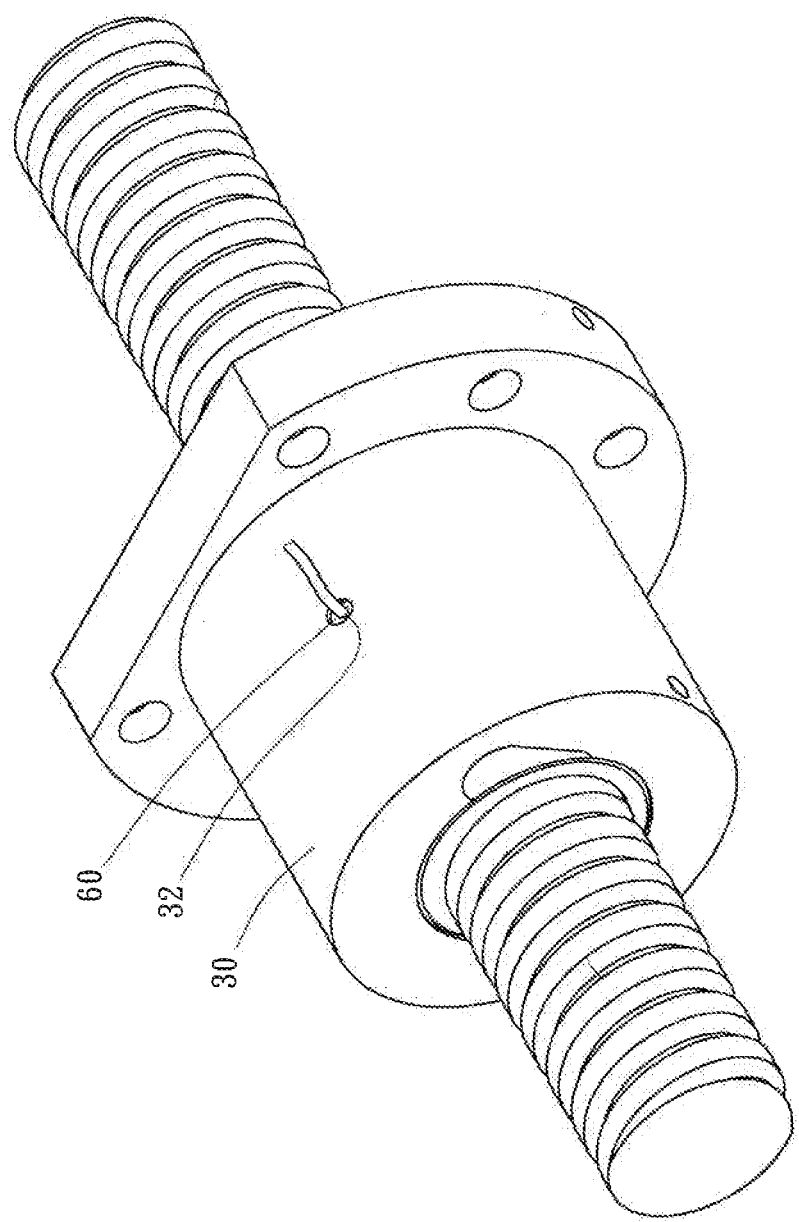
FIG. 6 is an elevational view of a linear motion system in accordance with a second embodiment of the present invention.
Figure 7:
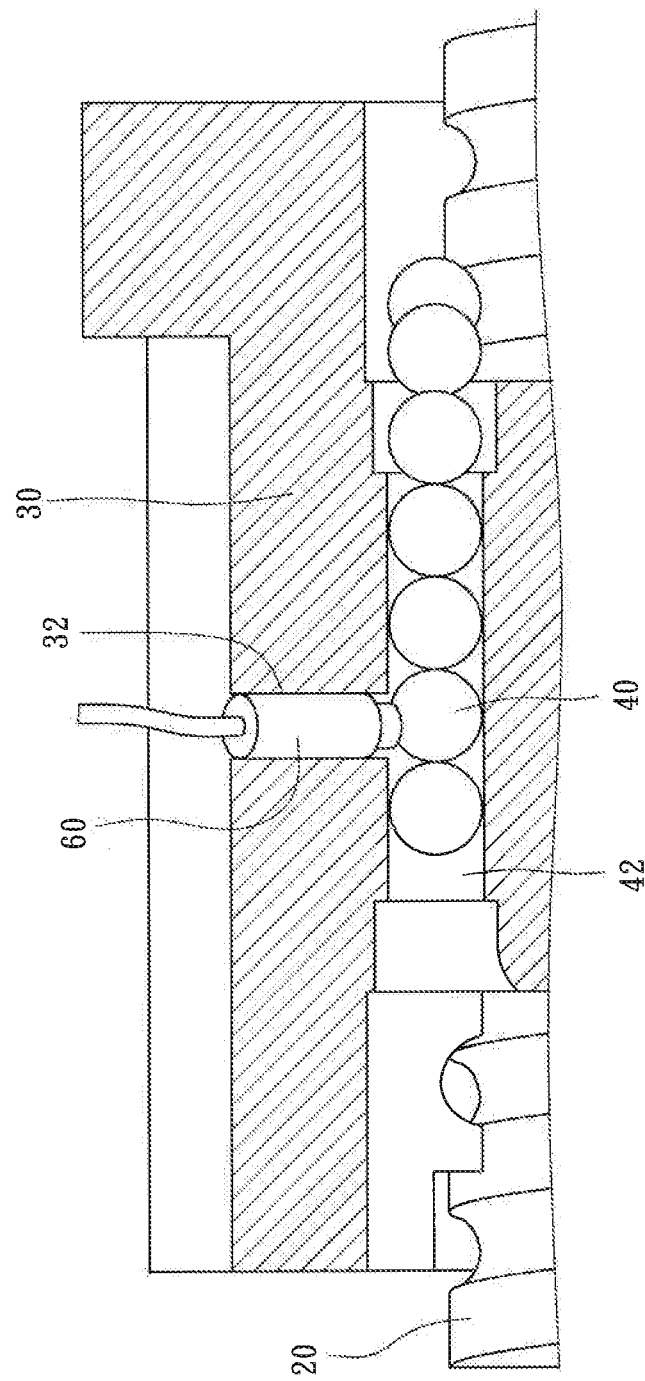
FIG. 7 is a partial sectional view of the linear motion system in accordance with the second embodiment of the present invention.

It should be clearly noted that the mounting position of the sensor 60 can be variously embodied. In a second embodiment of the present invention, as shown in FIGS. 6 and 7, the sensor 60 is directly embedded in a locating hole 32 in the movable member 30 that is in communication with the circulation passage 42 transversely, and adapted to detect a position change of each rolling element 40 in the circulation passage 42. Unlike the aforesaid first embodiment to have the grease storage container be fixedly hung on the elongated shaft 20, the grease storage container (not shown) in this second embodiment is externally attached to match the position of the sensor 60.

Figure 8:
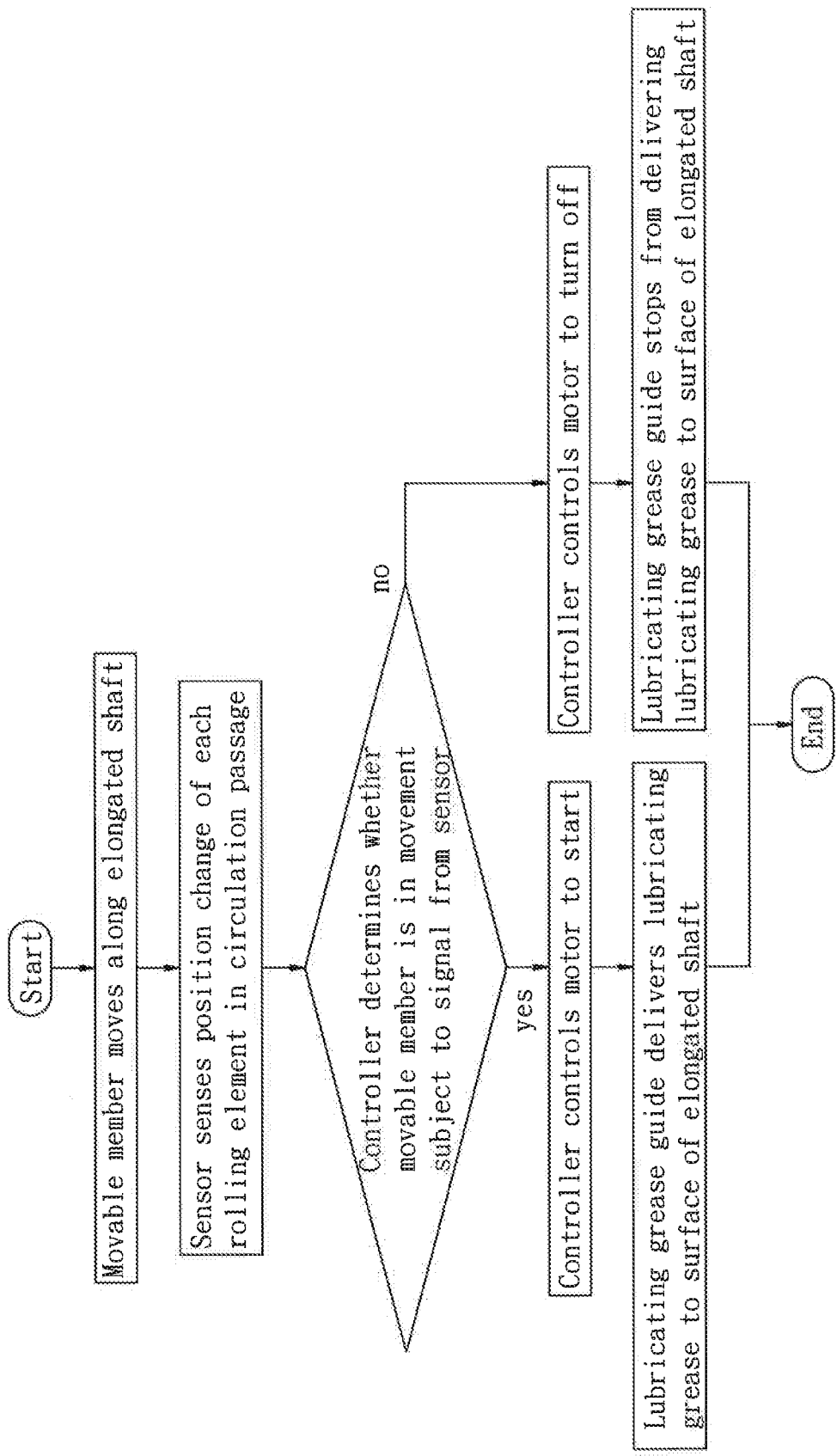
FIG. 8 is a flow chart illustrating the operation of the linear motion system in accordance with the second embodiment of the present invention.

Detailedly speaking, as shown in FIGS. 7 and 8, when one rolling element 40 moves along the circulation passage 42 into alignment with the sensor 60, the sensor 60 immediately provides an actuation signal to the controller 54. When the originally sensed rolling element 40 keeps moving along the circulation passage 42 to become misaligned with the sensor 60, the sensor 60 senses no signal and will interrupt the actuation signal, and the sensor 60 will provides an actuation signal to the controller 54 again when a next rolling element 40 enters into alignment with the sensor 60, and thus the sensor 60 can provide an actuation signal to the controller 54 intermittently.

Figure 9:
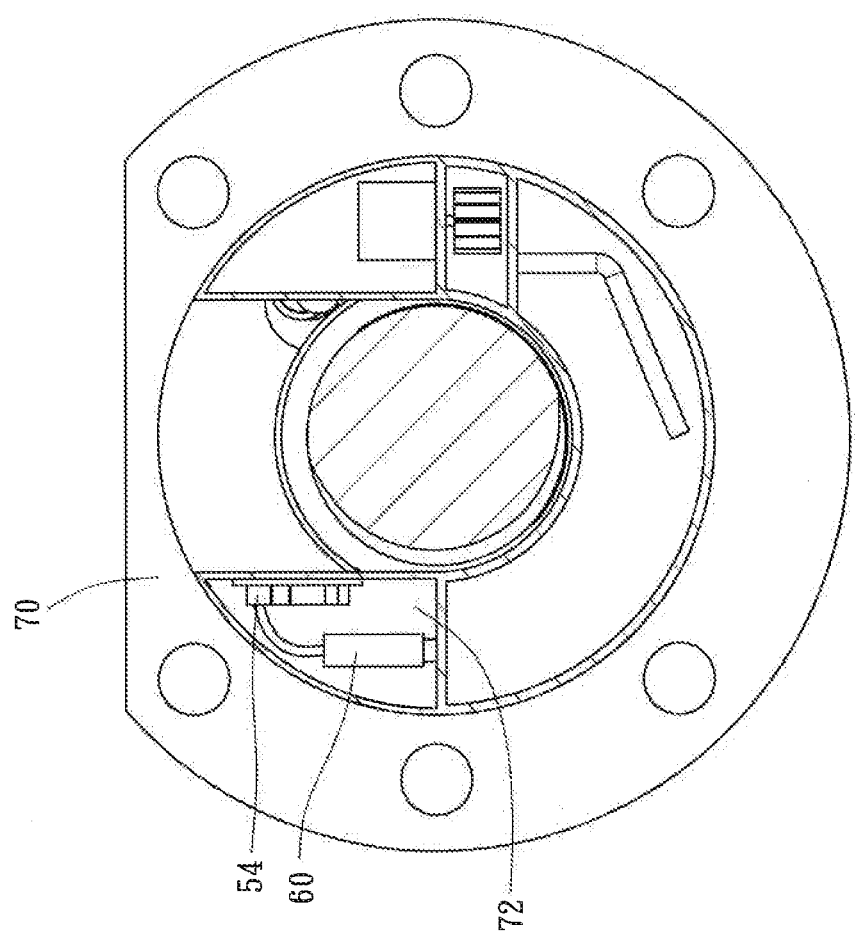
FIG. 9 is a sectional view of a linear motion system in accordance with a third embodiment of the present invention.
Figure 10:
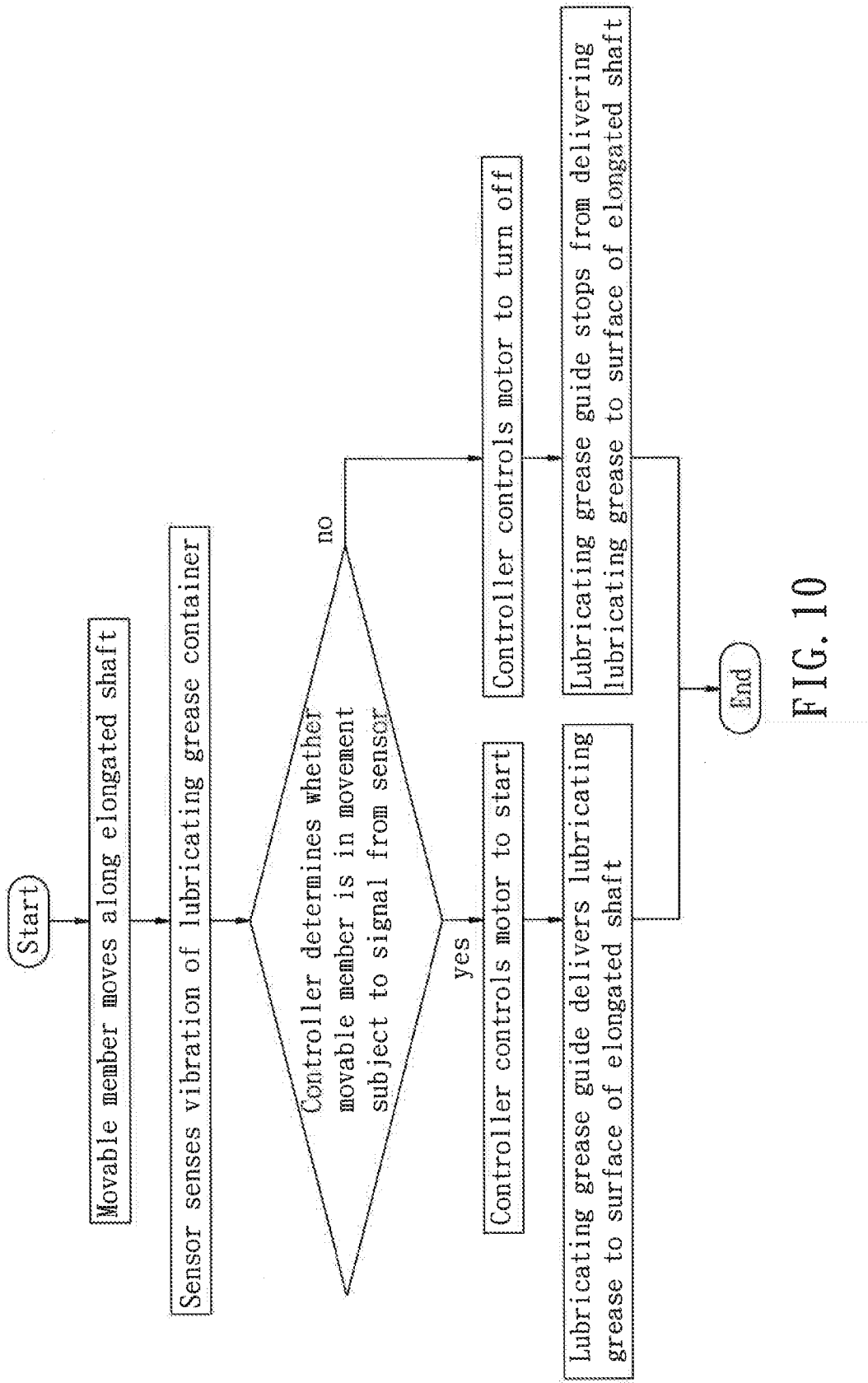
FIG. 10 is a flow chart illustrating the operation of the linear motion system in accordance with the third embodiment of the present invention.

On the other hand, the type of the sensor is not limited to proximity switch. As shown in FIGS. 9 and 10, the sensor 60 in accordance with a third embodiment of the present invention is a vibration sensor adapted to detect vibration of the grease storage container 70 during movement of the movable member 30, and to provide an actuation signal when it detects a signal. If the grease storage container 70 stands still, the sensor 70 provides no signal. Thus, the sensor 60 can provide an actuation signal to the controller 54 intermittently. Further, during installation, the sensor 60 and the controller 54 are fixedly mounted in the control chamber 72 of the grease storage container 70. Thus, in this third embodiment, it is not necessary to divide the control chamber 72 of the grease storage container 70 into two separated spaces by a second partition board 59 for different applications like the aforesaid first embodiment.

Figure 11:
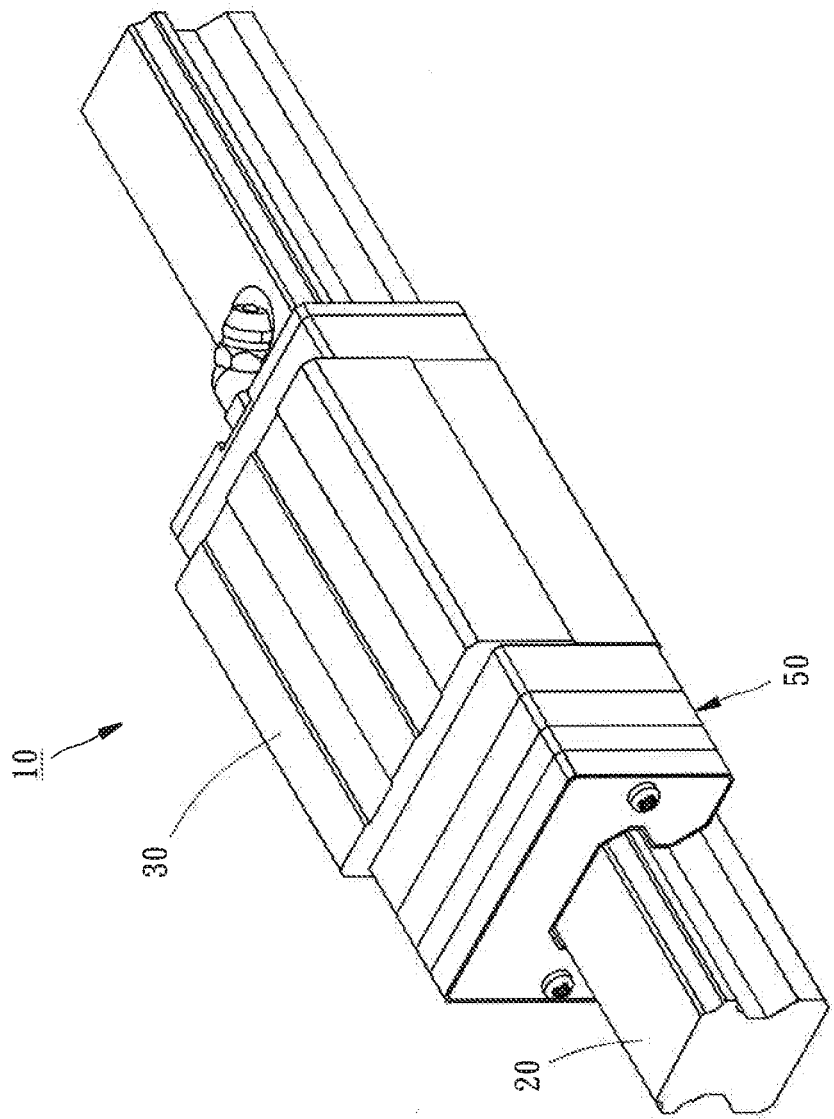
FIG. 11 is an elevational view of a linear motion system in accordance with a fourth embodiment of the present invention.

In conclusion, subject to the intermittent actuation signal provided by the sensor 60, the linear motion system 10 enables the controller 54 to determine whether the movable member 30 is in movement, and the controller 54 can control the lubricator unit 50 to dispense the lubricating grease only when the movable member 30 is in movement. When compared to the prior art design, the invention accurately prevents unnecessary waste and effectively saves the cost. Further, the linear motion system 10 in accordance with the present invention is not limited to the aforesaid ball screw. In a fourth embodiment of the present invention, as shown in FIG. 11, the linear motion system is a linear guideway. In this case, the elongated shaft 20 is a sliding rail, and the movable member 30 is a sliding block. This design of linear guideway can also match with the lubricator unit 50 and the sensor 60 to achieve a self-lubricating effect.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A linear motion system, comprising:
an elongated shaft;
a movable member movable linearly along said elongated shaft;
a plurality of rolling elements rotatably mounted between said elongated shaft and said movable member;
a lubricator unit comprising a grease storage container, a motor, a lubricating grease guide and a controller, said grease storage container comprising a grease storage chamber and a grease discharging hole in communication with said grease storage chamber, said grease storage chamber being adapted to store a lubricating grease and kept in communication with the surface of said elongated shaft via said grease discharging hole, said lubricating grease guide being mounted in said grease storage chamber of said grease storage container and connected to said motor and driven by said motor to guide said lubricating grease out of said grease storage chamber through said grease discharging hole to the surface of said elongated shaft, said controller being electrically connected to said motor and adapted to control the operation of said motor; and
a sensor electrically connected to said controller of said lubricator unit and adapted to provide an actuation signal to said controller intermittently subject to movement of said movable member to cause said controller to start said motor,
wherein said grease storage container further comprises a power chamber and a control chamber disposed adjacent to said grease storage chamber; said motor is mounted in said power chamber; said controller is mounted in said control chamber,
wherein said grease storage container is hung on said elongated shaft and connected to one end of said movable member; said control chamber has accommodated therein a stirrer; said sensor is fixedly mounted in said control chamber of said grease storage container and adapted to detect a position change of said stirrer upon movement of said movable member and to provide said actuation signal when detected a position change of said stirrer, wherein the grease storage chamber is divided by a first partition board into a main chamber and a sub chamber, wherein the control chamber is divided by a second partition board into a control slot and a stirring bath, wherein the power chamber and the main chamber are separated by the sub chamber, and wherein the control slot and the main chamber are separated by the stirring bath.

2. The linear motion system as claimed in claim 1, wherein said sensor is a proximity switch adapted to provide said actuation signal when sensed by said stirrer.

3. The linear motion system as claimed in claim 1, wherein said grease storage container is hung on said elongated shaft and connected to one end of said movable member; said sensor is a vibration sensor fixedly mounted in said control chamber of said grease storage container and adapted to detect vibration of said grease storage container upon movement of said movable member and to provide said actuation signal when a vibration signal is detected.

4. The linear motion system as claimed in claim 1, wherein said movable member and said elongated shaft define therebetween a circulation passage for the rolling of said rolling elements; said movable member comprises a locating hole transversely disposed in communication with said circulation passage; said sensor is embedded in said locating hole and adapted to detect a position change of any one of said rolling elements upon movement of said movable member and to further provide said actuation signal.

5. The linear motion system as claimed in claim 4, wherein said sensor is a proximity switch adapted to provide said actuation signal when one of said rolling elements is detected.

* * * * *